United States Patent
ÓBréartúin (10) Patent No.: US 6,275,400 B1
(45) Date of Patent: Aug. 14, 2001

(54) DROPPING IMPEDANCE POWER SUPPLY

(75) Inventor: Ciarán S. Ó Bréartúin, Frinco (IT)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/499,771

(22) Filed: Feb. 8, 2000

Related U.S. Application Data (60) Provisional application No. 60/119,553, filed on Feb. 10, 1999.

(51) Int. Cl.[7] ........................................... H02M 7/06
(52) U.S. Cl. ......................................... 363/126
(58) Field of Search ........................... 363/126, 125, 363/127; 318/806

(56) References Cited

U.S. PATENT DOCUMENTS

| | | | |
|---|---|---|---|
| 3,908,158 | * 9/1975 | Studtmann | 318/809 |
| 4,007,605 | * 2/1977 | Denny | 62/184 |
| 4,093,899 | * 6/1978 | Denny | 318/806 |
| 4,238,722 | 12/1980 | Ford | 320/25 |
| 4,344,032 | 8/1982 | Anlauf | 324/158 |
| 4,417,198 | 11/1983 | Mayfield | 323/315 |
| 4,638,397 | 1/1987 | Foley | 361/212 |
| 5,714,861 | 2/1998 | Hansen et al. | 318/799 |

FOREIGN PATENT DOCUMENTS

| | | |
|---|---|---|
| 460921 | 8/1968 | (DE) . |
| 0317 104 A2 | 5/1989 | (EP) . |
| 0831582 A2 | 3/1998 | (EP) . |
| 0831582 A3 | 1/2000 | (EP) . |
| 2248639 | 5/1975 | (FR) . |
| 1490071 | 10/1977 | (GB) . |
| 55-66297 | 5/1980 | (JP) . |
| 58-127589 | 7/1983 | (JP) . |

OTHER PUBLICATIONS

Adel S. Sedra and Kenneth C. Smith, Microelectronic Circuits, 3e, Chapter 3, pp. 116–168 (1989).

* cited by examiner

*Primary Examiner*—Adolf Deneke Berhane
(74) *Attorney, Agent, or Firm*—Howrey Simon Arnold & White, LLP (57) ABSTRACT

A dropping impedance power supply comprising a motor is series with a voltage regulator. When the motor operates, the power supply transforms an a.c. line voltage to a d.c. voltage. The motor drops the line voltage, and the voltage regulator clamps the voltage across the voltage regulator at approximately the d.c. voltage.

28 Claims, 5 Drawing Sheets

PRIOR ART

*FIG. 3*

PRIOR ART

DROPPING IMPEDANCE POWER SUPPLY

RELATED APPLICATIONS

This application claims the benefit of copending U.S. Provisional Patent Application Serial No. 60/119,553 filed on Feb. 10, 1999.

FIELD OF THE INVENTION

The field of the invention is a power supply, and more particularly, a dropping impedance power supply circuit for converting an a.c. line voltage to a d.c. electronic control voltage for a domestic oven and/or appliance.

BACKGROUND OF THE INVENTION

An electronic control for a conventional appliance, such as a typical domestic oven and/or cooktop appliance, requires a power supply. The power supply converts the line voltage available from a conventional residential outlet, such as 115 volts or 230 volts a.c., to a lower more useable voltage for electronic controls, such as a d.c. voltage between 3 volts and 48 volts, typically 12 volts d.c. There are several ways to transform the line voltage to the electronic control voltage including, but not limited to, an impedance dropping power supply and a transformer power supply.

Figure 1A:
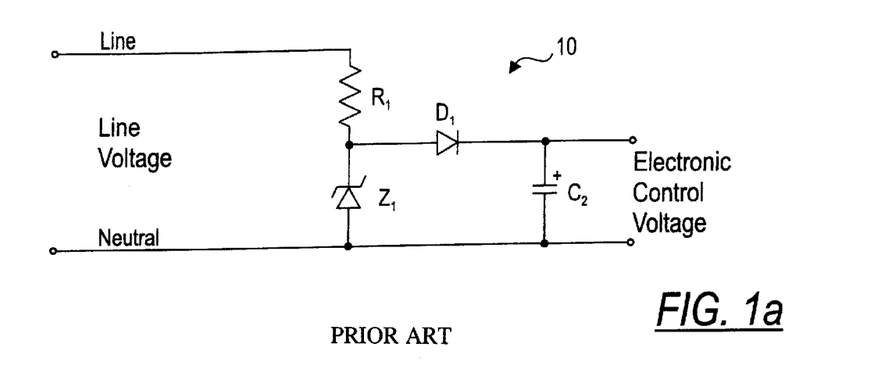
FIG. 1a is a schematic diagram of an electrical circuit for a resistive dropping power supply.
Figure 1B:
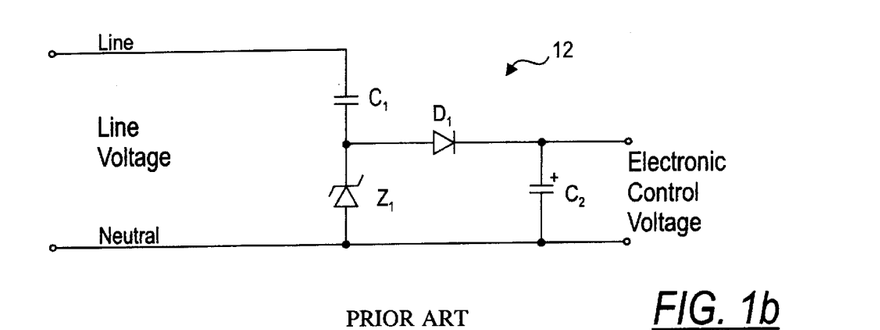
FIG. 1b is a schematic diagram of an electrical circuit for a reactive dropping power supply.

Impedance dropping power supplies are typically well suited for domestic oven applications because they occupy a small amount of space and are lightweight. FIG. 1a illustrates a conventional resistive dropping power supply 10, and FIG. 1b illustrates a conventional reactive (capacitive) dropping power supply 12. These power supplies 10 and 12 are non-isolating. Typically for use with an oven, the dropping power supplies 10 and 12 transform the line voltage of 230 volts a.c. to the electronic control voltage of approximately 12 volts d.c. The power supplies 10 and 12 are "half wave" circuits which work 50% of the time or for half of the line cycle when the line voltage is positive. When the line voltage is positive, a dropping impedance, either resistor R1 or capacitor C1, drops the voltage from the line, and a zener diode Z1 clamps the voltage across the zener diode Z1 at the desired electronic control voltage. A diode D1 and filter capacitor C2 rectify the voltage. When the line voltage is negative, the zener diode Z1 acts as a normal diode and no current is passed to the rectifying diode D1 and capacitor C2. To provide the 12 volt d.c. electronic control voltage, the zener diodes Z1 have a 12 volt rating to clamp the voltage across the zener diode Z1 at 12 volts.

Figure 1C:
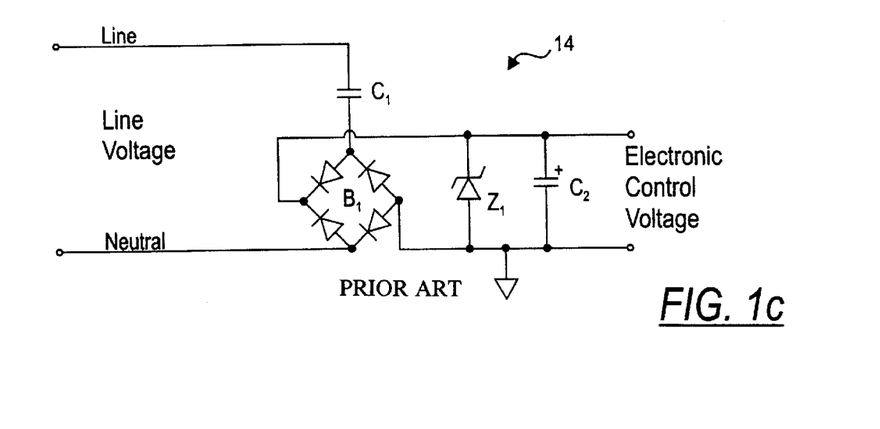
FIG. 1c is a schematic diagram of an electrical circuit for a full wave reactive dropping power supply.

FIG. 1c illustrates a "fill wave" reactive dropping power supply 14. The "full wave" circuit includes a full rectifier bridge B1 and works 100% of the time for both positive and negative line voltages. When the line voltage is positive, a dropping impedance, a capacitor C1, drops the voltage from the line, the diode bridge B1 rectifies the voltage, and a zener diode Z1 clamps the voltage across the zener diode Z1 at the desired electronic control voltage. When the line voltage is negative, the bridge B1 rectifies the line voltage to allow the zener diode Z1 to clanp the voltage across the zener diode Z1 at the desired electronic control voltage, and the dropping impedance C1 drops the voltage to the line. A filter capacitor C2 filters or smoothes the voltage. To provide the 12 volt d.c. electronic control voltage, the zener diodes Z1 have a 12 volt rating to clamp the voltage across the zener diode Z1 at 12 volts. A "full wave" resistive dropping power supply (not shown) would be similar to the "full wave" capacitive dropping power supply 14 of FIG. 1c with the dropping capacitor C1 replaced by a resistor.

In the impedance dropping power supplies 10, 12 and 14, the "unused" current passes through the zener diodes Z1. If the required current is very low, such as 20 mA, the dropping impedance can be a resistor R1 as depicted in the resistive dropping power supply 10 without causing significant self heating problems. For higher currents, such as 80 mA, the dropping impedance needs to be non-dissipative, namely reactive such as depicted in the capacitor C1 dropping power supply 12; otherwise, if the resistor R1 were used, too much heat is generated by the power supply. For currents of the order of 200 mA, more capacitance must be added for the dropping impedance resulting in larger costs for the dropping impedance power supply. The currents described above are examples that apply to a 230 volt line supply. For 115 volt line supply, these currents can be much higher.

Figure 2:
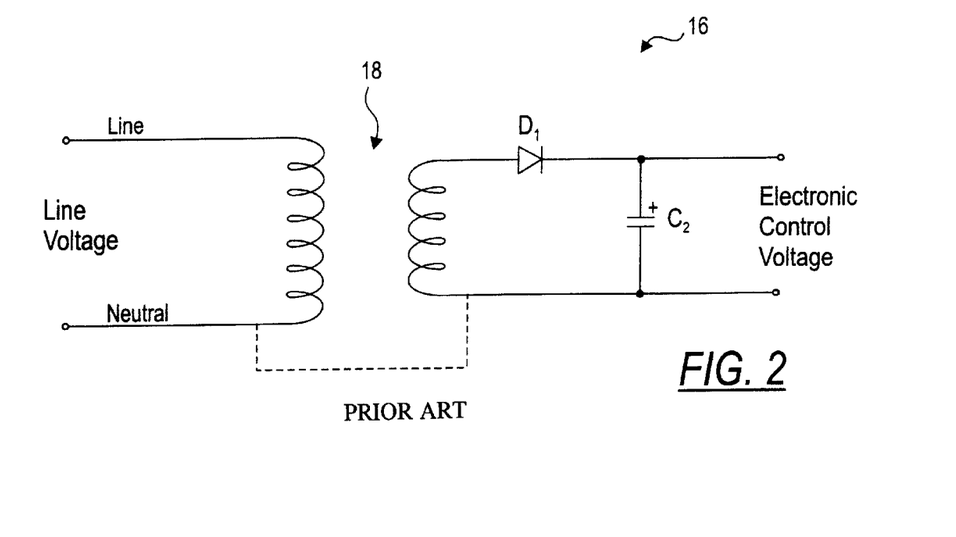
FIG. 2 is a schematic diagram of an electrical circuit for a transformer power supply.

Using the transformer based power supply in ovens can be problematic. FIG. 2 illustrates a conventional transformer based power supply 16. To provide the 12 volt d.c. electronic control voltage, the transformer 18 has a rating to transform the 230 volts a.c. line voltage to approximately 8 volts a.c. the peak value of which is approximately 12 volts, and a diode D1 and filter capacitor C2 rectify the voltage. This circuit is half wave power supply; however, it may be made into a fill wave power supply with the use of a bridge rectifier. One problem with using the transformer power supply is the high ambient temperatures of the oven application. Transformers are difficult to design as their operating temperatures approach the temperature of their insulation limits. In addition, European safety agency requirements demand that the transformer be protected against straight secondary shorts which can require the addition of expensive thermal fuses. Additionally, the transformer tends to be very bulky and heavy creating packaging difficulties for the electronic control in the domestic oven appliance. Furthermore, transformers may be a very costly component for an appliance. Despite these shortcomings, transformers are typically used for current levels above 100 mA for oven power supplies because the additional capacitance required by the reactive dropping power supply 12 is more expensive than the transformer. Transformer based power supplies also have the advantage of being isolated if required.

To meet more strict electromagnetic interference ("EMI") regulations, modem appliances need EMI filters to prevent high frequency disturbances created by the appliance from affecting the power line supply. Typically, European laundry appliances require EMI filters to negate the effects of commutator switching on universal motors and the switching of various inductive loads. The increased use of electronics in the controls for appliances, such as triacs that may cause disturbances, contributes to the need for EMI filters. However, conventional ovens do not usually incorporate EMI filters because oven loads are almost entirely resistive. In addition, ovens are typically lower cost appliances, so manufacturers of ovens have avoided design changes that require the addition of EMI filters.

The domestic oven appliance includes fans, such as an internal convection cooking fan and a cooling fan. The cooling fan functions to keep the user accessible areas, such as the door handle, relatively cool and to keep the electronic controls below their maximum temperature rating. The conventional oven cooling and convection fans are typically single speed, low cost single-phase induction motor driven fans. These fans are rated at the line voltage, typically 230 volts a.c. The nominal rating of the typical cooling fan is approximately 20 W to 40 W, although due to the inherent inefficiency of the fans, very little of this power is useful. On the other hand, this very inefficiency makes the motor behave somewhat like a DC motor, in that its speed is highly dependent on the applied voltage. The current flow through the motor is a consequence of the applied voltage and the speed at which the motor is running. Since the motor is not very efficient, it appears to be very resistive, and therefore the speed and current are largely functions of the applied voltage. If the motor were more efficient, the relationship would be more complex. The typical current flow in the fans for ovens is approximately 150 mA to 250 mA.

Ovens equipped with electronic controls sometimes drive cooling and convection fans with triacs, rather than relays; however, this system has a very significant drawback. The triac driven loads control introduce objectionable power line disturbances requiring an expensive EMI filter.

Thus, it is desired to develop a low cost power supply circuit that transforms the line voltage to the electronic control voltage, that eliminates the need for a transformer, that permits variable speed fan operation, and minimizes electromagnetic interference.

SUMMARY OF THE INVENTION

In accordance with one aspect of the present invention, there is provided a dropping impedance power supply having a load, such as a motor, as the dropping impedance element. When the motor operates, the power supply transforms an a.c. line voltage to a d.c. electronic controls voltage. The dropping impedance power supply includes the motor in series with a voltage regulator, such as a zener diode. The motor drops the line voltage, and the zener diode clamps the voltage across zener diode at approximately the electronic control voltage. The dropping impedance power supply may further include a diode and a filter capacitor to rectify the electronic control voltage. Additionally, the power supply may be made a full wave power supply by connecting a diode rectifier bridge between the motor and the zener diode.

In accordance with another aspect of the present invention, there is provided a dropping impedance power supply having a load, such as a motor, in parallel with a dropping capacitor as the dropping impedance element. The dropping impedance element of the load in parallel with the capacitor is connected in series with a voltage regulator, such as a zener diode. The power supply transforms an a.c. line voltage to a d.c. electronic controls voltage. When the motor operates, current flows through the dropping capacitor and the motor. When the motor does not operate, current flows through only the dropping capacitor. The zener diode clamps the voltage across the zener diode at approximately the electronic control voltage. The dropping impedance power supply may further include a diode and a filter capacitor to rectify the electronic control voltage.

In accordance with a further aspect of the present invention, there is provided a power supply for transforming an a.c. line voltage to a d.c. voltage for an electronic controller of an appliance. The power supply comprises a load as a dropping impedance element in series with voltage regulator, such as a zener diode. The load has a current approximately equal to an amount of current required by the electronic controller. Additionally, the load provides an operational function for the appliance. For example, the load may be a fan motor, a heating element or a lamp.

BRIEF DESCRIPTION OF THE DRAWINGS

Other aspects and advantages of the invention will become apparent upon reading the following detailed description and upon reference to the drawings.

While the invention is susceptible to various modifications and alternative forms, specific embodiments thereof have been shown by way of example in the drawings and are herein described in detail. It should be understood, however, that the description herein of the specific embodiments is not intended to limit the invention to the particular forms disclosed, but on the contrary, the intention is to cover all modifications, equivalents, and alternatives falling within the spirit and scope of the invention as defined in the appended claims.

DESCRIPTION OF ILLUSTRATIVE EMBODIMENTS

Figure 3:
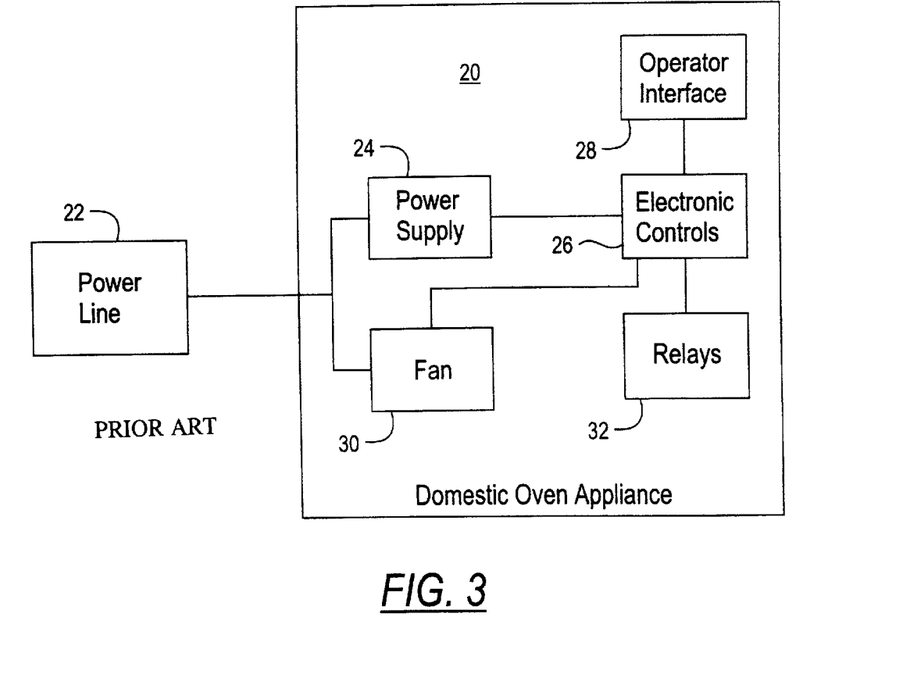
FIG. 3 is a simplified block diagram of a conventional domestic oven apparatus.

In general, the present invention is a dropping impedance power supply with motor control. Essentially, the present invention permits fan operation of an oven appliance while simultaneously providing a power supply for the electronic controls for the oven. FIG. 3 illustrates the general context of the present invention. Although, the dropping impedance power supply is described in reference to its use in a domestic oven and/or cook-top appliance, the present invention is not restricted to these appliances and may be used for any appliance or other application requiring a power supply. Simply, the present invention may be used in any appliance having load, whose current is comparable to that required of the power supply and which is to be active any time the power supply is called on to operate.

In general, FIG. 3 illustrates the general context of the invention. The power line 22 supplies 230 volts a.c. to the domestic oven appliance 20. The domestic oven 20 includes a power supply 24 that transforms the line voltage of approximately 230 volts a.c. to an electronic control voltage of approximately 12 volts d.c. The power supply 24 supplies the electronic controls 26 with the approximately 12 volts d.c. electronic control voltage and supplies the current necessary to operate the oven 20. The electronic controls 26 coordinate the operation of the oven 20 including the operator interface 28, fan 30 and relays 32. FIG. 3 generally shows relays 32 to indicate the other loads of the domestic oven which may include heating elements, lights and other fans.

Figure 4:
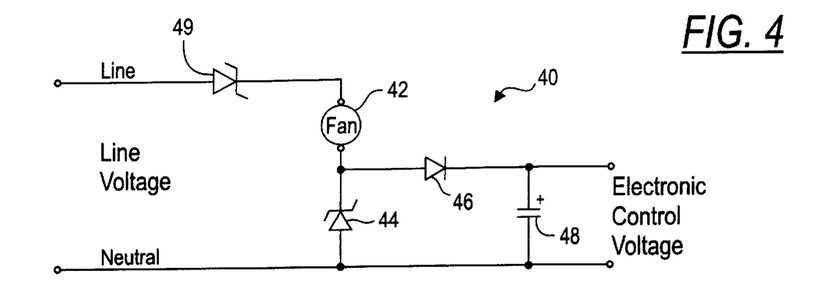
FIG. 4 is a schematic diagram of an electrical circuit for one embodiment of an impedance dropping power supply with motor control of the present invention.

FIG. 4 illustrates a simple embodiment of the present invention of a dropping impedance power supply 40 with motor control. The dropping impedance power supply 40 has a fan motor 42 as the dropping impedance element. The power supply 40 also includes a zener diode 44, a diode 46 and a filter capacitor 48 similar to the dropping impedance power supplies depicted in FIGS. 1a and 1b. Although the zener diode 44 is shown in the illustrated embodiments of the present invention, any voltage regulator known to one of the ordinary skill in the art may be used in place of the zener diode.

The dropping power supply 40 is a half wave circuit that transforms the line voltage of approximately 230 volts a.c. to the electronic control voltage of approximately 12 volts d.c. When the line voltage is positive, the fan motor 42 drops the voltage from the line, and a zener diode 44 clamps the voltage across the zener diode 44 at the desired electronic control voltage. The diode 46 and filter capacitor 48 act together to rectify the voltage. When the line voltage is negative, the zener diode 44 acts as a normal diode and no current passes to the rectifying diode 46 and capacitor 48. To provide the 12 volt d.c. electronic control voltage typically used for the electronic controls of the oven, the zener diode 44 has a 12 volt rating to clamp the voltage across the zener diode 44 at 12 volts. The dropping impedance power supply 40 illustrated in FIG. 4 also includes a zener diode 49 on the line to balance the fan motor voltage. The zener diode 49 has the same voltage rating as the zener diode 44.

When the fan motor 42 is operating, the typical current flow through the fan is about 150 mA to 250 mA that is also the current amount required of the typical oven electrical power supply. The dropping impedance power supply 40 of FIG. 4 may be altered by replacing the fan motor 42 with a different load needed for a different applications as long as the different load provides the necessary current flow. Other examples of an appropriate load would be an oven lamp and small heating elements. Additionally, the power supply 40 of FIG. 4 may be a full wave circuit. This full wave circuit may be formed by modifying the circuit illustrated in FIG. 1c with the full rectifier bridge B1 by simply replacing the capacitor C1 with the fan motor 42.

Figure 5A:
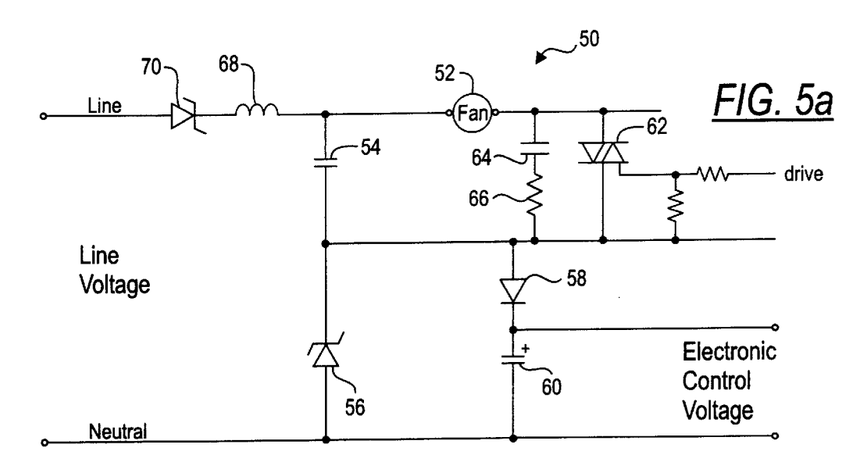
FIG. 5a is a schematic diagram of an electrical circuit for another embodiment of the impedance dropping power supply with motor control.

FIG. 5a illustrates another embodiment of a dropping impedance power supply 50 with load control. The dropping impedance power supply 50 includes a dropping capacitor 54 in parallel with the fan motor 52 for the dropping impedance element. When the fan motor 52 is not operating, the dropping capacitor 54 is the only dropping impedance supplying current to the zener diode 56. In contrast to the dropping impedance power supply 40 of FIG. 4 which does not supply power to the electronic controls when the fan motor 42 is not operating, the dropping impedance power supply 50 of FIG. 5a provides power to the electronic controls when the fan is not operating. With the selection of the capacitance value for the dropping capacitor 54, the dropping impedance power supply 50 may provide current, such as approximately 30 mA, to the electronic controls to maintain basic operation of the typical oven operator interface. When the oven enters the cooking cycle requiring relays to be switched on which requires a higher current, the fan 52 may be first turned on so that more current is made available to the zener diode reference.

The dropping power supply 50 is a half wave circuit that transforms the line voltage of 230 volts a.c. to the electronic control voltage of 12 volts d.c. When the line voltage is positive, the fan motor 52 in parallel with the dropping capacitor 54 drop the voltage from the line, and the zener diode 56 clamps the voltage across the zener diode 56 at the desired electronic control voltage. A diode 58 and a filter capacitor 60 rectify the voltage. When the line voltage is negative, the zener diode 56 acts as a normal diode and no current is passed to the rectifying diode 58 and capacitor 60. To provide the approximately 12 volt d.c. electronic control voltage typically used for the electronic controls of the oven, the zener diode 56 has a 12 volt to 14 volt rating to clamp the voltage across the zener diode 56 at 12 volts to 14 volts. When the fan motor 52 is operating, the current flows through both the fan motor 52 and dropping capacitor 54 to provide power to the electronic controls of the oven.

The dropping impedance power supply 50 of FIG. 5a also includes a triac 62 to control the fan motor 52. The electronic controls of the oven provide a drive signal to the triac 62 via pulses. Alternatively, a relay circuit (not shown) may replace the triac 62. Additionally, any switching device known to one of ordinary skill in the art may be used to control the motor 52.

Figure 5B:
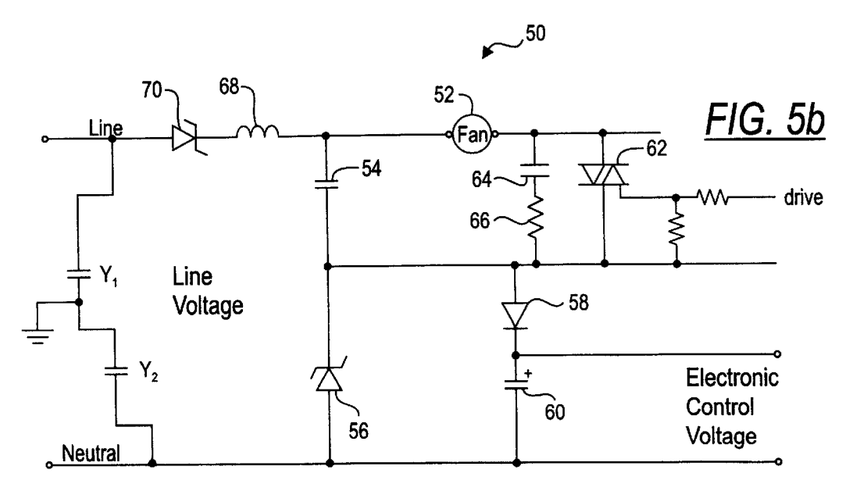
FIG. 5b is a schematic diagram of an electrical circuit for the impedance dropping power supply of FIG. 5a with a ground bypass filter.

To protect the triac 62, a snubber consisting of a series combination of a capacitor 64 and resistor 66 is placed in parallel with the triac 62. The snubber also helps in EMI performance. An inductor 68 together with the dropping capacitor 54 provide the elements for an EMI filter to direct the high frequency disturbances generated by the triac 62 away from the line. For simplicity in explaining the dropping power supply 50, the connections to ground for the EMI filter are not shown in FIG. 5a; however, one of ordinary skill in the art would know the proper ground connections. For example, if a ground bypass filter were required to meet EMI limits, two Y capacitors Y1 and Y2 could be connected between the Line and Neutral respectively to earth ground as illustrated in FIG. 5b. In the typical jargon of one of ordinary skill in the art, X capacitors are those connected between Line and Neutral, such as dropping capacitor 54. While, Y capacitors are those connected between any of these and earth ground. Y capacitors are required only if there is high frequency loss toward earth, e.g. from motor windings to earthed motor core that is a probable condition when a triac 62 is involved. The dropping impedance power supply 50 illustrated in FIG. 5a also includes a zener diode 70 on the line to balance the fan motor voltage. The zener diode 70 has the same voltage rating as zener diode 56.

The dropping impedance power supply 50 relies on the fact that the cooling fan 52 is generally used only when the oven is being operated by the electronic controls. When the cooling fan 52 is off, the oven should be off too, so the need for current to operate the relays or special displays is not present. As mentioned above, a small amount of current typically required by the electronic controls in order to operate a user interface is provided via the dropping capacitor 54. In the power supply 50, about 5% to 10% of the line voltage does not reach the fan motor 52. Thus, the motor may need to be slightly modified to operate at this reduced voltage.

Figure 6:
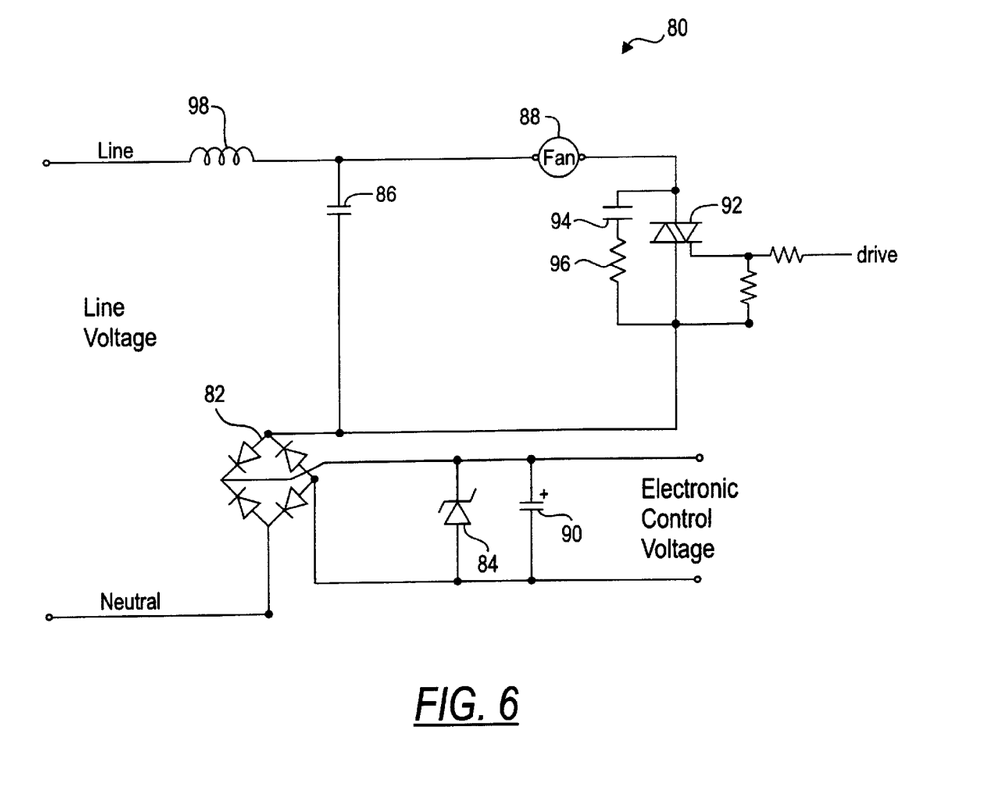
FIG. 6 is a schematic diagram of an electrical circuit for another embodiment of the impedance dropping power supply with motor control.

FIG. 6 illustrates another embodiment of a dropping impedance power supply 80 having a full rectifier bridge 82. The dropping impedance power supply 80 is similar to the dropping impedance power supply 50 with the exception of the bridge 82. The bridge 82 allows the zener diode 84 to capture the current flow when the line voltage is positive and negative. In contrast to the impedance dropping power supply 50 in which the zener diode 56 captured the current flow only when the line voltage was positive, the diode bridge 82 allows current to be supplied to the electronic controls when the line voltage is positive and negative. Thus, the dropping impedance power supply 80 is a full wave circuit while the dropping impedance power supply 50 is a half wave circuit. The current supplied to the electronic controls by the dropping impedance power supply 80 is approximately double that of the dropping impedance power supply 50 of FIG. 5a.

The dropping impedance power supply 80 of FIG. 6 is similar to the dropping impedance power supply 50, except for the bridge 82. The dropping impedance power supply 80 includes the dropping capacitor 86 in parallel with the fan motor 88 for the dropping impedance element. In an alternative embodiment, the dropping capacitor 86 may be replaced with a resistor. When the fan motor 88 is not operating, the dropping capacitor 86 is the only dropping impedance supplying current to the zener diode 84 to provide power to the electronic controls when the fan 88 is not operating. With the selection of the capacitance value for the dropping capacitor 86, the dropping impedance power supply 80 may provide current, such as approximately 30 mA, to the electronic controls to maintain basic operation of the typical oven operator interface. When the oven enters the cooking cycle requiring relays to be switched on which requires a higher current, the fan 88 may be first turned on so that more current is made available to the zener diode reference.

The dropping power supply 80 transforms the line voltage of approximately 230 volts a.c. to the electronic control voltage of approximately 12 volts d.c. When the line voltage is positive, the fan motor 88 in parallel with the dropping capacitor 86 drop the voltage from the line, the diode bridge 82 rectifies the voltage, and the zener diode 84 clamps the voltage across the zener diode 84 at the desired electronic control voltage. A filter capacitor 90 filters or smoothes the voltage. When the line voltage is negative, the bridge 82 rectifies the line voltage to allow the zener diode 84 to clamp the voltage across the zener diode 84 at the desired electronic control voltage. To provide the approximately 12 volt d.c. electronic control voltage typically used for the electronic controls of the oven, the zener diode 84 has a 12 volt rating to clamp the voltage across the zener diode 84 at approximately 12 volts. When the fan motor 88 is operating, the current flows through both the fan motor 88 and dropping capacitor 86 to provide power to the electronic controls of the oven.

The dropping impedance power supply 80 of FIG. 6 also includes a triac 92 to control the fan motor 88. The electronic controls of the oven provide a drive signal to the triac 92 via pulses. To protect the triac 92, a snubber consisting of a series combination of a capacitor 94 and resistor 96 is placed in parallel with the triac 92. An inductor 98 together with the dropping capacitor 86 provide the elements of an EMI filter to direct the high frequency disturbances generated by the triac 92 away from the line.

Figure 7:
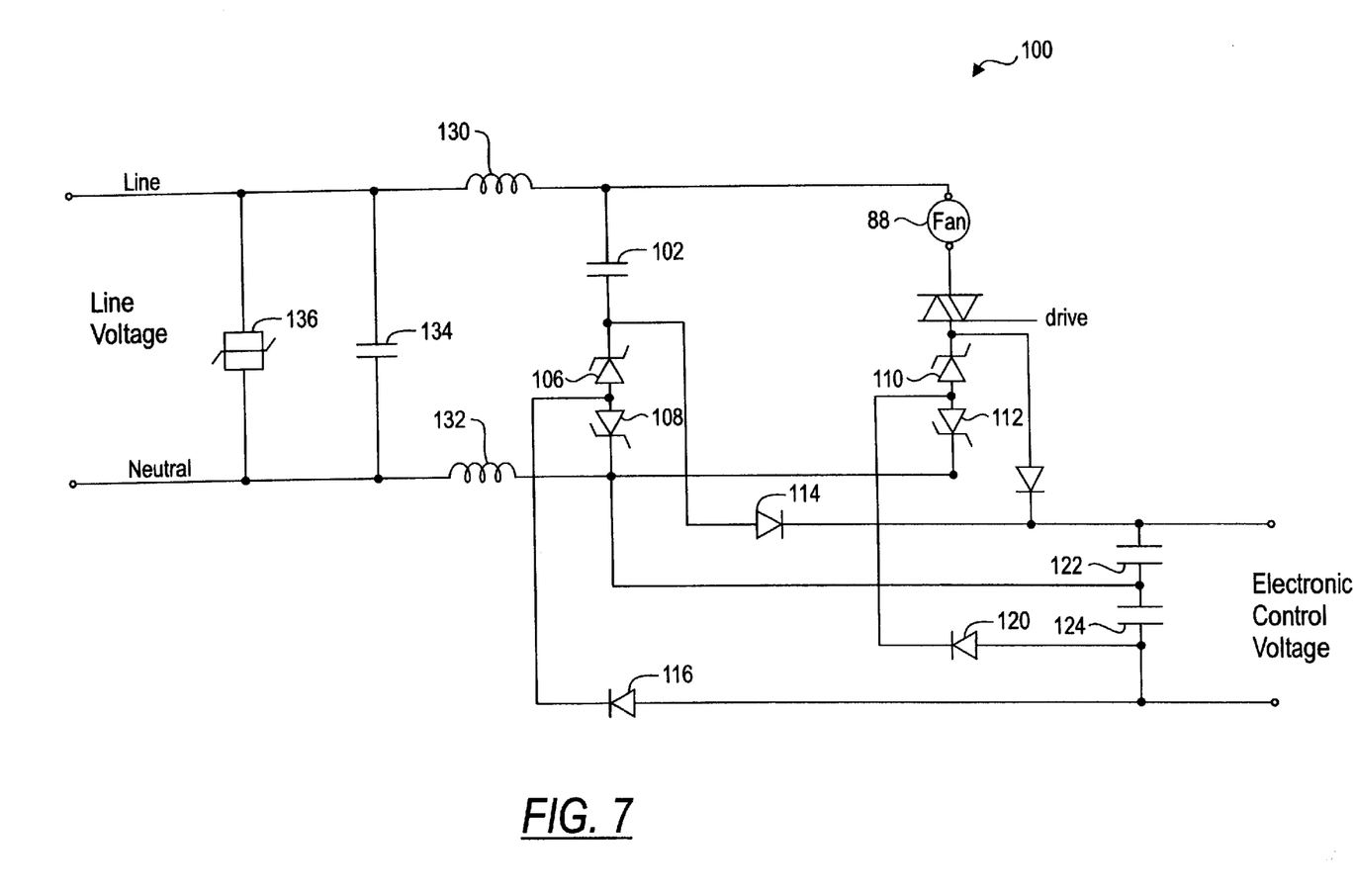
FIG. 7 is a schematic diagram of an electrical circuit for another embodiment of the impedance dropping power supply with motor control.

FIG. 7 illustrates another embodiment of a dropping impedance power supply 100. The dropping impedance power supply 100 is similar to the dropping impedance power supply 50 except that the dropping impedance power supply 100 negates the power factor correction behavior of the dropping impedance power supplies 50 and 80. One shortcoming of the dropping impedance power supplies 50 and 80 described above is that since current through the dropping capacitor leads the voltage and the current through the fan motor lags the voltage, the instantaneous sum of the two currents will always be lower than the sum of their absolute values. In the dropping impedance power supplies 50 and 80, the zener reference captures the former, but not the latter. The dropping impedance power supply 100 depicted in FIG. 7 on the other hand, through the use of two separate capture circuits, connected to the zener diodes 106/108 and 110/112 respectively, captures both the leading and lagging currents individually, before they sum, thus capturing the maximum available current.

FIG. 7 illustrates the dropping impedance power supply 100 with separate lagging and leading current capture. The dropping impedance power supply 100 has a dropping capacitor 102 with an example capacitance value of approximately one microfarad as a dropping impedance element. Additionally, a fan motor 104 is another the dropping impedance element. In series with the dropping capacitance 102 are a pair of opposed zener diodes 106 and 108. Likewise, the fan motor 104 is in series with another pair of opposed zener diodes 110 and 112. The zener diodes 106, 108, 110 and 112 all have a 12 volt rating. Diodes 114, 116, 118 and 120 together with capacitors 122 and 124 rectify the voltage. In an alternative embodiment, the capacitor 102 may be replaced with a resistor except the resistor would be connected across the fan motor 104 and the triac 128.

When the fan motor 104 is not operating, the dropping capacitor 102 provides the current for the electronic controls. When the line current is positive, the zener diode 106 provides a voltage across the capacitor 122 of approximately 12 volts. When the line current is negative, the zener diode 108 provides a voltage across the capacitor 124 of approximately 12 volts.

When the fan motor 104 is operating, the current is flowing through both the dropping capacitor 102 and the fan motor 104. When the line current is positive, the zener diodes 106 and 110 provide a voltage across the capacitor 122 of approximately 12 volts. When the line current is negative, the zener diodes 108 and 112 provide a voltage across the capacitor 124 of approximately 12 volts.

The dropping impedance power supply 100 of FIG. 7 also includes a triac 128 to control the fan motor 104. The electronic controls of the oven provide a drive signal to the triac 128 via pulses. Because the triac 128 generates EMI noise, inductors 130 and 132 together with a capacitor 134 across the line the dropping capacitor 102 provide the elements of an EMI filter to direct the high frequency disturbances generated by the triac 128 away from the line. A surge protector 136 is also placed across the line to protect the power supply 100. The inductors 130, capacitor 134 and surge protector 136 have no impact on the power supply function; rather, they provide EMI and surge protection.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. A dropping impedance power supply for transforming an a.c. line voltage to a d.c. voltage, said power supply comprising:
    a motor for dropping said line voltage to a first predetermined level;
    a voltage regulator connected in series with said motor, said voltage regulator clamps a voltage across said voltage regulator to a second predetermined level for said d.c. voltage; and
    a dropping impedance connected in parallel with said motor.

2. The power supply of claim 1 wherein said voltage regulator is a zener diode.

3. The power supply of claim 1 wherein said dropping impedance is a capacitor.

4. The power supply of claim 1 wherein said dropping impedance is a resistor.

5. The power supply of claim 1 further including a rectifier connected in parallel with said voltage regulator.

6. The power supply of claim 1 further including a diode and a filter capacitor connected in parallel with said voltage regulator.

7. The power supply of claim 1 further including a rectifying diode bridge connected between said voltage regulator and said motor.

8. The power supply of claim 1 wherein said motor is a fan motor.

9. The power supply of claim 8 wherein said fan motor is controlled driven by a switching device.

10. The power supply of claim 9 wherein said switching device is a triac.

11. The power supply of claim 9 wherein said switching device is a relay.

12. The power supply of claim 1 further including an EMI filter.

13. The power supply of claim 3 further including lagging and leading current correction circuitry comprising a first pair of opposing zener diodes in series with said motor and a second pair of opposing zener diodes in series with said capacitor.

14. A dropping impedance power supply for transforming an a.c. line voltage to a d.c. voltage, said power supply comprising:
    a dropping impedance element comprising a motor capable of being switched on and off connected in parallel with a capacitor;
    a voltage regulator connected in series with said dropping impedance element.

15. A power supply for transforming an a.c. line voltage to a d.c. voltage for an electronic controller of an appliance comprising:
    a dropping impedance element comprising a load having a current approximately equal to an amount of current required by said electronic controller, said load providing an operational function for said appliance; and
    a voltage regulator connected in series with said dropping impedance element.

16. The power supply of claim 15 wherein said voltage regulator is a zener diode.

17. The power supply of claim 15 wherein said dropping impedance further includes a capacitor in parallel with said load.

18. The power supply of claim 15 wherein said dropping impedance further includes a resistor in parallel with said load.

19. The power supply of claim 15 wherein said load is capable of being switched on and off.

20. The power supply of claim 15 wherein said load is a motor.

21. The power supply of claim 19 wherein said motor is a fan motor.

22. The power supply of claim 15 wherein said load is a heating element.

23. The power supply of claim 15 wherein said load is a lamp.

24. The power supply of claim 15 further including a rectifier connected in parallel with said voltage regulator.

25. The power supply of claim 15 further including a rectifying diode bridge connected between said load and said voltage regulator.

26. A power supply for transforming an a.c. line voltage to a d.c. voltage having a predetermined voltage level comprising:
    a motor for dropping said line voltage to said predetermined voltage level, said motor capable of being switched between an operating state and a not operating state, when said motor is in said operating state a motor current flowing through said motor, said motor current being sufficient to operate an electronic controller for an appliance when said appliance is operating; and
    a voltage regulator for clamping a voltage across said voltage regulator at said predetermined voltage level.

27. The power supply of claim 26 further including a dropping capacitor in parallel with said motor, when said motor is in said not operating state a capacitor current flows through said capacitor and not said motor, when said appliance is not operating said capacitor current being sufficient to operate said electronic controller.

28. The power supply of claim 27 further including a first pair of opposing zener diodes connected in series with said motor to capture said motor current that is lagging and a second pair of opposing zener diodes connected in series with said capacitor to capture said capacitor current that is leading.

* * * * *